United States Patent [19]

Imoehl et al.

[11] Patent Number: 5,146,896
[45] Date of Patent: Sep. 15, 1992

[54] MOUNTING FUEL INJECTION SYSTEM COMPONENTS ON A FUEL RAIL

[75] Inventors: William J. Imoehl; Michael J. Hornby, both of Williamsburg, Va.

[73] Assignee: Siemens Automotive L.P., Auburn Hills, Mich.

[21] Appl. No.: 735,554

[22] Filed: Jul. 25, 1991

[51] Int. Cl.⁵ .............................................. F02M 55/02
[52] U.S. Cl. .................................... 123/470; 123/456; 123/463; 137/248
[58] Field of Search .............. 123/456, 463, 457, 447, 123/467, 470, 469, 468; 137/248

[56] References Cited

U.S. PATENT DOCUMENTS

| | | | |
|---|---|---|---|
| 4,474,160 | 10/1984 | Gartner | 123/468 |
| 4,475,516 | 10/1984 | Atkins et al. | 123/470 |
| 4,539,961 | 9/1985 | Atkins et al. | 123/468 |
| 4,570,602 | 2/1986 | Atkins et al. | 123/468 |
| 4,741,315 | 5/1988 | Fehrenbach et al. | 123/463 |
| 4,768,487 | 9/1988 | Yamamoto et al. | 123/470 |
| 4,776,313 | 10/1988 | Freismuth et al. | 123/470 |
| 4,823,754 | 4/1989 | Minamoto et al. | 123/470 |
| 4,909,221 | 3/1990 | Heuser | 123/470 |
| 4,938,510 | 7/1990 | Gmeiner et al. | 285/39 |
| 4,984,548 | 1/1991 | Hudson | 123/468 |
| 4,991,556 | 2/1991 | Mahnke et al. | 123/463 |
| 5,002,030 | 3/1991 | Mahnke | 123/469 |
| 5,012,784 | 5/1991 | Fehrenbach | 123/463 |
| 5,027,777 | 7/1991 | De Bruyn | 123/456 |
| 5,035,224 | 7/1991 | Hornby | 123/470 |
| 5,040,512 | 8/1991 | Twilton | 123/470 |
| 5,058,554 | 10/1991 | Takeda | 123/456 |

FOREIGN PATENT DOCUMENTS 9015240 12/1990 Fed. Rep. of Germany ...... 123/470

*Primary Examiner*—Carl S. Miller
*Attorney, Agent, or Firm*—George L. Boller; Russel C. Wells

[57] ABSTRACT

A fuel pressure regulator is disposed in a socket in a fuel rail and retained therein by means of a one-piece metal retention clip which has a flat forked blade portion that is inserted through a slot in the socket sidewall to span the socket in overlying relation to a flange extending around the outside of the cylindrical body of the pressure regulator so as to capture the pressure regulator in the socket and which also has a resilient body-clasping portion in the form of a pair of opposing spring fingers that are cantilevered on and spaced axially of the flat forked blade portion by means of a joining portion of the clip and that come to resiliently embrace the body of the pressure regulator as the forked blade portion comes to span the socket.

1 Claim, 2 Drawing Sheets

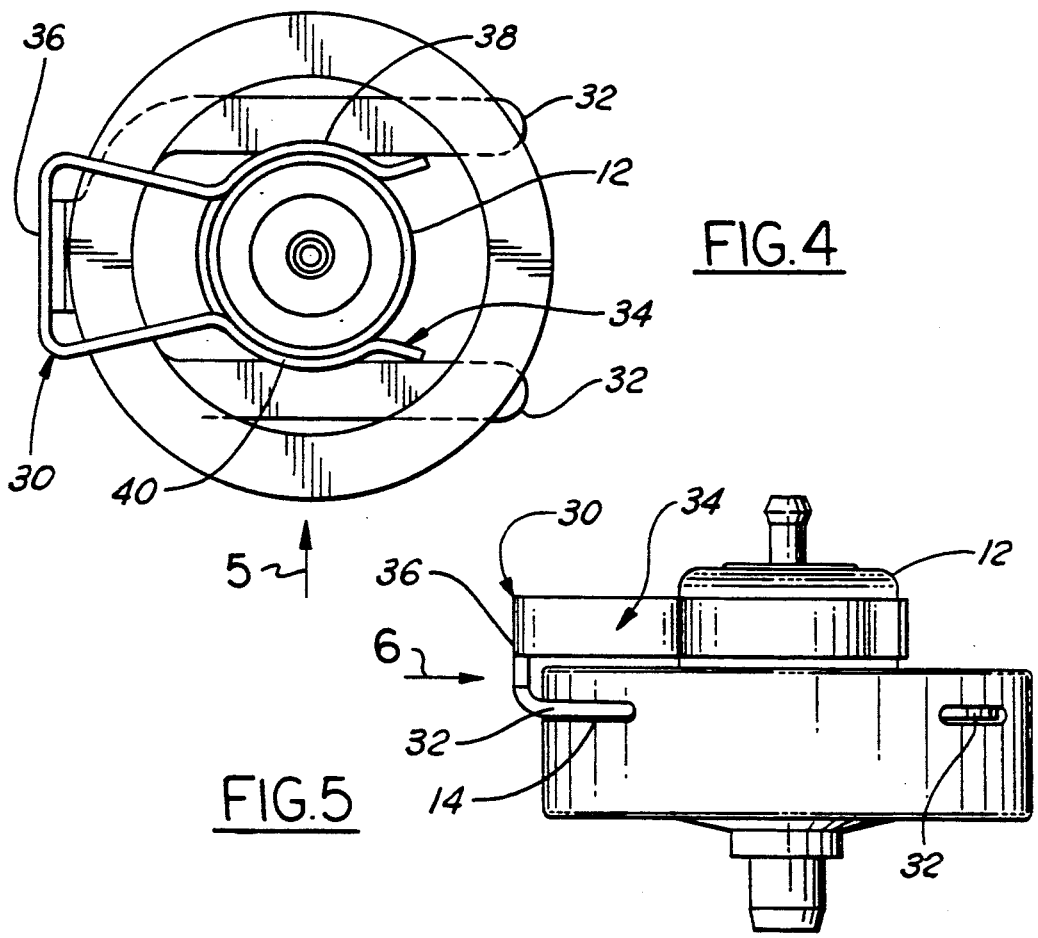
FIG. 4
FIG. 5
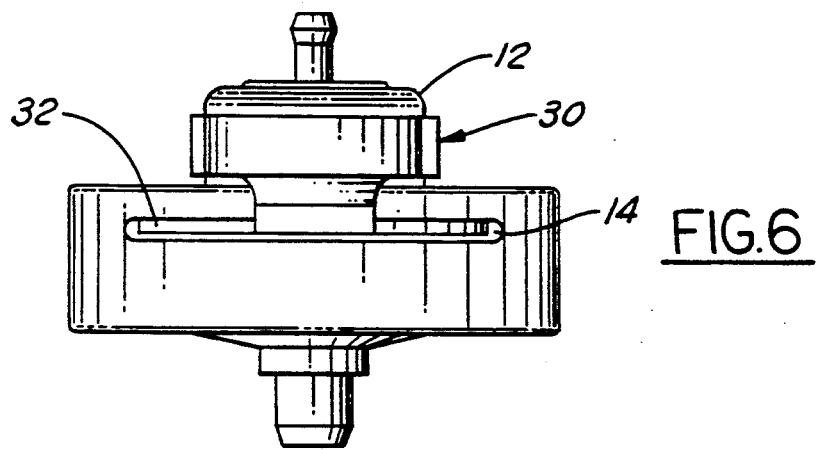
FIG. 6

MOUNTING FUEL INJECTION SYSTEM COMPONENTS ON A FUEL RAIL

FIELD OF THE INVENTION

This invention relates generally to fuel injection systems for internal combustion engines and in particular to the retention of fuel pressure regulators and fuel injectors on fuel rails.

BACKGROUND AND SUMMARY OF THE INVENTION

Various types of clips or clamps for separably retaining a fuel injector or a pressure regulator in its installed position on a fuel rail are illustrated by: U.S. Pat. Nos. 4,474,160; 4,475,516; 4,539,961; 4,570,602; 4,741,315; 4,768,487; 4,823,754; and 4,991,556. The Applicants' related application Ser. No. 07/648,264 filed Jan. 31, 1991 discloses a new and unique means for attaching a metal fuel tube to a molded plastic fuel rail. That new and unique means includes a one-piece metal clip. The Applicants have made the further discovery that a similar clip can provide a new and unique means for separably retaining a fuel injector or a fuel pressure regulator in a socket of the fuel rail. The present invention relates to that discovery.

The present invention enables a fuel pressure regulator or a fuel injector to be facilely and expediently assembled to and separably retained on a fuel rail with the use of only a single additional part, namely a one-piece metal retention clip. Details of the invention, along with its advantages and benefits will be seen and gathered from the ensuing description of a presently preferred embodiment. Drawings accompany this disclosure and present a presently preferred embodiment according to the best mode contemplated at this time for carrying out the invention.

BRIEF DESCRIPTION OF THE DRAWING

FIG. 4 is an end view which includes the retention clip installed.

FIG. 5 is a view in the direction of arrow 5 in FIG. 4.

FIG. 6 is a view in the direction of arrow 6 in FIG. 5.

DESCRIPTION OF THE PREFERRED EMBODIMENT

Figure 1:
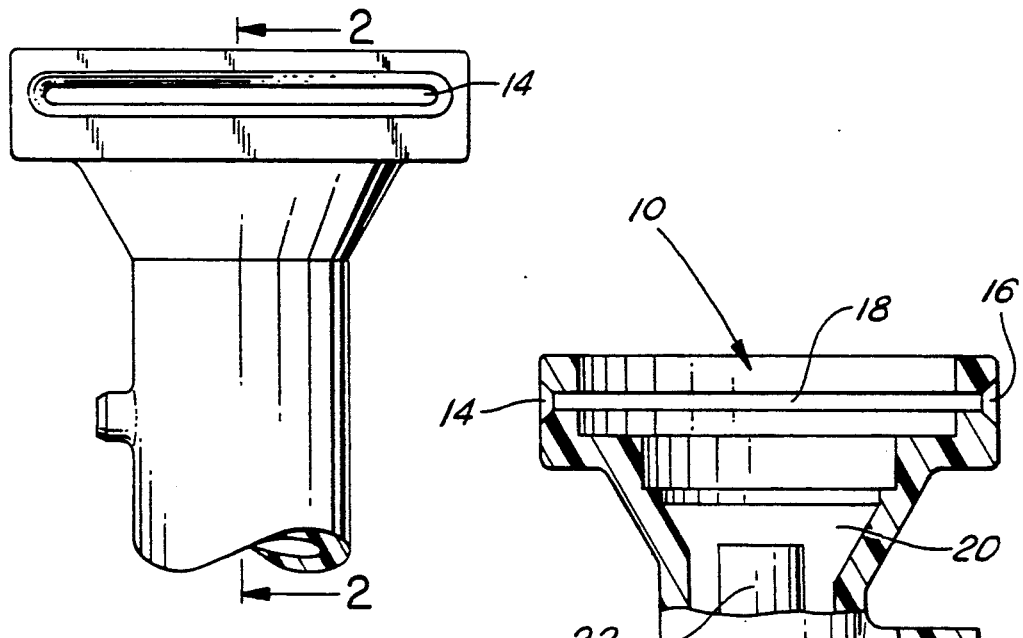
FIG. 1 is a fragmentary view of a fuel rail in the vicinity of a socket for receiving a fuel pressure regulator.
Figure 2:
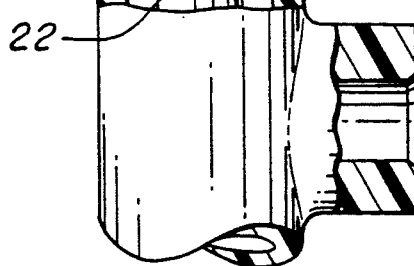
FIG. 2 is a view, partly in section, in the direction of arrows 2—2 in FIG. 1.

FIGS. 1 and 2 show a fuel rail socket 10 having an open end for receiving a fuel pressure regulator 12 like that shown in the remaining Figs. Thin elongated slots 14, 16 are provided in opposite sides of the socket wall. Between the slots there are also grooves 18 in the opposite sides of the sidewall of the socket. The fuel rail contains an outer passage 20 that supplies fuel to the pressure regulator and an inner passage 22 that carries excess return fuel from the pressure regulator when the pressure regulator is disposed in the socket in the usual manner.

The pressure regulator has a cylindrical body 24 that is surrounded by a circular flange 26 that extends around the outside of the body. Flange 26 seats on a ledge 28 on the inside of the socket wall. In the FIG. 3 position, slots 14, 16 and grooves 18 just overlie flange 26.

FIGS. 4-6 show a one-piece metal retention clip 30 that retains the fuel pressure regulator in its installed position. The clip is fabricated from metal of generally uniform thickness by conventional forming techniques. Clip 30 comprises a thin flat forked blade portion 32 that is received in slots 14, 16 and laterally spans the socket between said slots in overlying relation to flange 26. The clip further comprises a body-clasping portion 34 that is spaced from forked blade portion 32 in the direction axially of the socket and joins with the forked blade portion externally of the socket by means of a joining portion 36. The body-clasping portion comprises resilient spring fingers 38, 40 cantilevered on joining portion 36 and engaging opposite sides of body 24 exterior to an ensealed zone 42 which contains liquid fuel passing through the fuel rail. In the fingers, the generally uniform thickness of the metal is disposed at ninety degrees to the generally uniform thickness of the metal in the forked blade portion.

Figure 3:
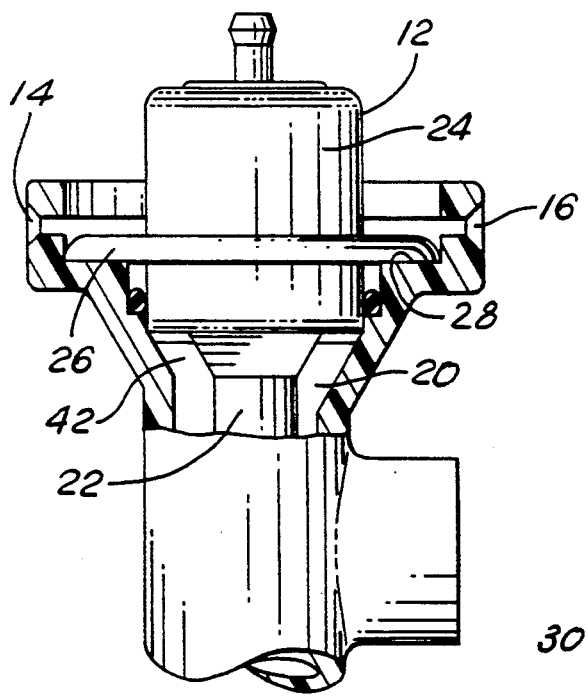
FIG. 3 is a view like FIG. 2, but with the fuel pressure regulator having been disposed in the socket.

After the pressure regulator has been installed into the socket as in FIG. 3, the free ends of the tines of the forked blade portion are aligned with one of the slots 14, 16, and the clip is then advanced radially. The tines of the forked blade portion pass through the interior of the socket in overlying relation to flange 26 and the shapes of the fingers 38, 40 allow them to first flex outwardly to fit over body 24, and as the clip approaches fully installed position, they resiliently relax to ultimately resiliently embrace the body in the fully installed position which is shown in FIGS. 4-6. It can be seen that the tips of the tines protrude slightly beyond slot 16 in the fully installed position.

Figure 7:
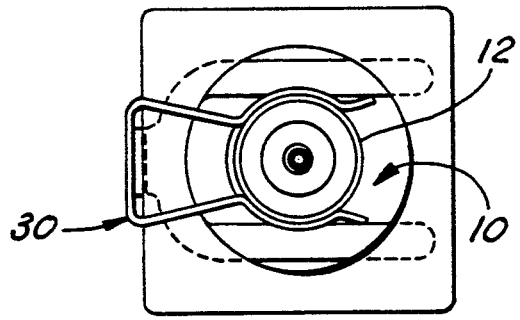
FIG. 7 is a modified form of FIG. 4.

FIG. 7 shows a modified form which is like that already described with the exception that the outside of the socket has a square shape rather than the round shape shown in FIG. 4.

While a presently preferred embodiment has been illustrated and described, it should be understood that principles are applicable to other embodiments.

What is claimed is:

1. An internal combustion engine fuel rail assembly comprising a fuel rail having a socket in which is received a particular device selected from the group of devices consisting of fuel injectors and pressure regulators, such devices having cylindrically shaped bodies that are circumferentially bounded by flange means extending around and radially outwardly of said bodies and that cooperatively define with said socket an ensealed zone that contains liquid fuel passing through the fuel rail, and a one-piece metal clip having generally uniform thickness that separably mounts on said fuel rail and that when mounted on the fuel rail with said particular device received in said socket serves to prevent said particular device from being removed from said socket characterized in that said fuel rail comprises thin elongate slots on opposite sides of said socket that are exterior to said ensealed zone, and said clip comprises a thin forked blade portion that is received in said slots by insertion along a particular direction radial to said socket and particular device and that laterally spans said socket between said slots in overlying relation to said flange means, said clip further comprises a body-clasping portion that is spaced from said forked blade portion in the direction axially of said socket and particular device and joins with said forked blade portion externally of said socket by means of a joining portion that is disposed, as viewed axially of said socket and particular device, at an end of said clip that is toward one end of said particular direction, said body-clasping portion comprising resilient spring fingers cantilevered on said joining portion and engaging opposite sides of said body exterior to said ensealed zone, and in said fingers said generally uniform thickness is disposed at ninety degrees to said generally uniform thickness in said forked blade portion.

* * * * *